United States Patent
Brown et al.

(10) Patent No.: US 12,131,096 B2
(45) Date of Patent: *Oct. 29, 2024

(54) CONTEXTUAL INDEXING OF MEDIA ITEMS

(71) Applicant: Sonos, Inc., Santa Barbara, CA (US)

(72) Inventors: Amber Brown, Santa Barbara, CA (US); Diane Roberts, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,867

(22) Filed: Sep. 25, 2023

(65) Prior Publication Data

US 2024/0012606 A1    Jan. 11, 2024

Related U.S. Application Data

(63) Continuation of application No. 17/657,281, filed on Mar. 30, 2022, now Pat. No. 11,768,655, which is a
(Continued)

(51) Int. Cl.
*G06F 3/16*      (2006.01)
*G06F 16/41*     (2019.01)
(Continued)

(52) U.S. Cl.
CPC .............. *G06F 3/16* (2013.01); *G06F 16/41* (2019.01); *G06F 16/61* (2019.01); *G06F 16/634* (2019.01); *G06F 16/635* (2019.01); *G06F 16/639* (2019.01)

(58) Field of Classification Search
CPC .......... G06F 3/16; G06F 16/61; G06F 16/634; G06F 16/41; G06F 16/635; G06F 16/639
See application file for complete search history.

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| EP | 1947847 A1 | 7/2008 |

(Continued)

OTHER PUBLICATIONS

AudioTron Quick Start Guide, Version 1.0, Mar. 2001, 24 pages.
(Continued)

*Primary Examiner* — Fan S Tsang
*Assistant Examiner* — David Siegel
(74) *Attorney, Agent, or Firm* — FORTEM IP LLP

(57) ABSTRACT

Example techniques related to a sub-index of a media index. An example implementation may involve maintaining, on a mobile device, a first index of audio tracks associated with a particular user profile, the audio tracks indexed in the first index consisting of a particular subset of audio tracks that are indexed in a second index. Based on receiving the input data indicating the search query, the mobile device searches, within the first index, for audio tracks corresponding to the search query. If the audio tracks corresponding to the search query are not found in the first index, the mobile device sends to one or more servers of the cloud service, a request to search the second index for audio tracks corresponding to the search query.

30 Claims, 6 Drawing Sheets

Related U.S. Application Data continuation of application No. 17/073,841, filed on Oct. 19, 2020, now Pat. No. 11,294,617, which is a continuation of application No. 16/779,629, filed on Feb. 2, 2020, now Pat. No. 10,809,965, which is a continuation of application No. 16/154,163, filed on Oct. 8, 2018, now Pat. No. 10,552,112, which is a continuation of application No. 15/344,023, filed on Nov. 4, 2016, now Pat. No. 10,095,464, which is a continuation of application No. 14/447,410, filed on Jul. 30, 2014, now Pat. No. 9,524,339.

(51) Int. Cl.
  *G06F 16/61*     (2019.01)
  *G06F 16/632*    (2019.01)
  *G06F 16/635*    (2019.01)
  *G06F 16/638*    (2019.01)

(56) References Cited

U.S. PATENT DOCUMENTS

| | | | |
|---|---|---|---|
| 5,923,902 | A | 7/1999 | Inagaki |
| 5,960,194 | A | 9/1999 | Choy et al. |
| 6,025,838 | A | 2/2000 | Bardon et al. |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,483,538 | B2 | 1/2009 | McCarty et al. |
| 7,545,440 | B2 | 6/2009 | Kim et al. |
| 7,560,637 | B1 | 7/2009 | Robbin et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,788,138 | B2 | 8/2010 | Mehmann et al. |
| 7,788,582 | B2 | 8/2010 | Robbin et al. |
| 7,853,341 | B2 | 12/2010 | McCarty et al. |
| 7,956,272 | B2 | 6/2011 | Wysocki et al. |
| 7,987,294 | B2 | 7/2011 | Bryce et al. |
| 8,014,423 | B2 | 9/2011 | Thaler et al. |
| 8,017,852 | B2 | 9/2011 | Yamashita et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,276,076 | B2 | 9/2012 | Torrens et al. |
| 8,483,853 | B1 | 7/2013 | Lambourne |
| 8,634,944 | B2 | 1/2014 | Bull et al. |
| 8,683,378 | B2 | 3/2014 | Bull et al. |
| 8,766,079 | B2 | 7/2014 | Utsuki et al. |
| 8,954,855 | B2 | 2/2015 | Shirai et al. |
| 8,977,963 | B1 | 3/2015 | Joyce et al. |
| 9,471,573 | B2 | 10/2016 | Faenger et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0054134 | A1 | 5/2002 | Kelts et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2006/0156239 | A1 | 7/2006 | Jobs et al. |
| 2007/0025194 | A1 | 2/2007 | Morse et al. |
| 2007/0142944 | A1 | 6/2007 | Goldberg et al. |
| 2008/0109422 | A1* | 5/2008 | Dedhia ............... G06F 16/285 |
| | | | 707/999.005 |
| 2008/0256032 | A1 | 10/2008 | Mgnoli et al. |
| 2009/0059512 | A1 | 3/2009 | Lydon et al. |
| 2011/0093101 | A1 | 4/2011 | Casagrande |
| 2011/0129201 | A1 | 6/2011 | McLean |
| 2011/0143653 | A1 | 6/2011 | Lane et al. |
| 2013/0047087 | A1 | 2/2013 | Yamahara et al. |
| 2013/0198268 | A1 | 8/2013 | Hyman |
| 2013/0198632 | A1 | 8/2013 | Hyman |
| 2014/0067827 | A1 | 3/2014 | Bilinski et al. |
| 2014/0229828 | A1* | 8/2014 | Bilinski ............... G06F 3/01 |
| | | | 715/716 |
| 2015/0149901 | A1 | 5/2015 | Otto et al. |
| 2015/0347511 | A1* | 12/2015 | Schmidt ............... G06F 16/48 |
| | | | 707/769 |

FOREIGN PATENT DOCUMENTS

| | | |
|---|---|---|
| KR | 20010090215 | 10/2001 |
| KR | 20050051785 | 6/2005 |
| WO | 200153994 | 7/2001 |
| WO | 2003093950 A2 | 11/2003 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

European Patent Office, European Search Report mailed on Oct. 18, 2017, issued in connection with EP Application No. 15826909.2, 8 pages.

European Patent Office, Summons to Attend Oral Proceedings mailed on Apr. 9, 2019, issued in connection with European Application No. 15826909.2, 10 pages.

First Action Interview Office Action mailed on Jul. 13, 2016, issued in connection with U.S. Appl. No. 14/447,410, filed Jul. 30, 2014, 9 pages.

International Bureau, International Preliminary Report on Patentability mailed Jan. 30, 2014, issued in connection with International Application No. PCT/US2012/047620, filed on Jul. 20, 2012, 7 pages.

International Searching Authority, International Preliminary Report on Patentability mailed on Feb. 9, 2017, issued in connection with International Application No. PCT/US2015/042800, filed on Jul. 30, 2015, 11 pages.

International Searching Authority, International Search Report and Written Opinion mailed on Dec. 18, 2015, issued in connection with International Application No. PCT/US2015/042800, filed on Jul. 30, 2015, 12 pages.

International Searching Authority, International Search Report mailed on Dec. 27, 2012, issued in connection with International Application No. PCT/US2012/047620, filed on Jul. 20, 2011, 3 pages.

International Searching Authority, Written Opinion mailed on Dec. 27, 2012, issued in connection with International Application No. PCT/US2012/047620, filed on Jul. 20, 2011, 5 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

(56) References Cited

OTHER PUBLICATIONS

Non-Final Office Action mailed Aug. 6, 2021, issued in connection with U.S. Appl. No. 17/073,841, filed Oct. 19, 2020, 8 pages.
Non-Final Office Action mailed on Dec. 11, 2017, issued in connection with U.S. Appl. No. 15/344,023, filed Nov. 4, 2016, 22 pages.
Notice of Allowance mailed on Dec. 1, 2021, issued in connection with U.S. Appl. No. 17/073,841, filed Oct. 19, 2020, 9 pages.
Notice of Allowance mailed on Jul. 11, 2018, issued in connection with U.S. Appl. No. 15/344,023, filed Nov. 4, 2016, 9 pages.
Notice of Allowance mailed on Jun. 19, 2020, issued in connection with U.S. Appl. No. 16/779,629, filed Feb. 2, 2020, 10 pages.
Notice of Allowance mailed on May 19, 2023, issued in connection with U.S. Appl. No. 17/657,281, filed Mar. 30, 2022, 9 pages.
Notice of Allowance mailed on Sep. 19, 2019, issued in connection with U.S. Appl. No. 16/154,163, filed Oct. 8, 2018, 10 pages.
Notice of Allowance mailed on Oct. 28, 2016, issued in connection with U.S. Appl. No. 14/447,410, filed Jul. 30, 2014, 9 pages.
Palm, Inc., "Handbook for the Palm VII Handheld," May 2000, 311 pages.
Preinterview First Office action mailed on May 12, 2016, issued in connection with U.S. Appl. No. 14/447,410, filed Jul. 30, 2014, 6 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

CONTEXTUAL INDEXING OF MEDIA ITEMS

CROSS REFERENCE TO RELATED APPLICATIONS

This application is a continuation of U.S. patent application Ser. No. 17/657,281, filed Mar. 30, 2022, now U.S. Pat. No. 11,768,655, which is a continuation of U.S. patent application Ser. No. 17/073,841, filed Oct. 19, 2020, now U.S. Pat. No. 11,294,617, which is a continuation of U.S. patent application Ser. No. 16/779,629, filed Feb. 2, 2020, now U.S. Pat. No. 10,809,965, which is a continuation of U.S. patent application Ser. No. 16/154,163, filed Oct. 8, 2018, now U.S. Pat. No. 10,552,112, which is a continuation of U.S. patent application Ser. No. 15/344,023, filed Nov. 4, 2016, now U.S. Pat. No. 10,095,464, which is a continuation of U.S. patent application Ser. No. 14/447,410, filed Jul. 30, 2014, now U.S. Pat. No. 9,524,339, all of which are incorporated herein by reference in their entireties.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
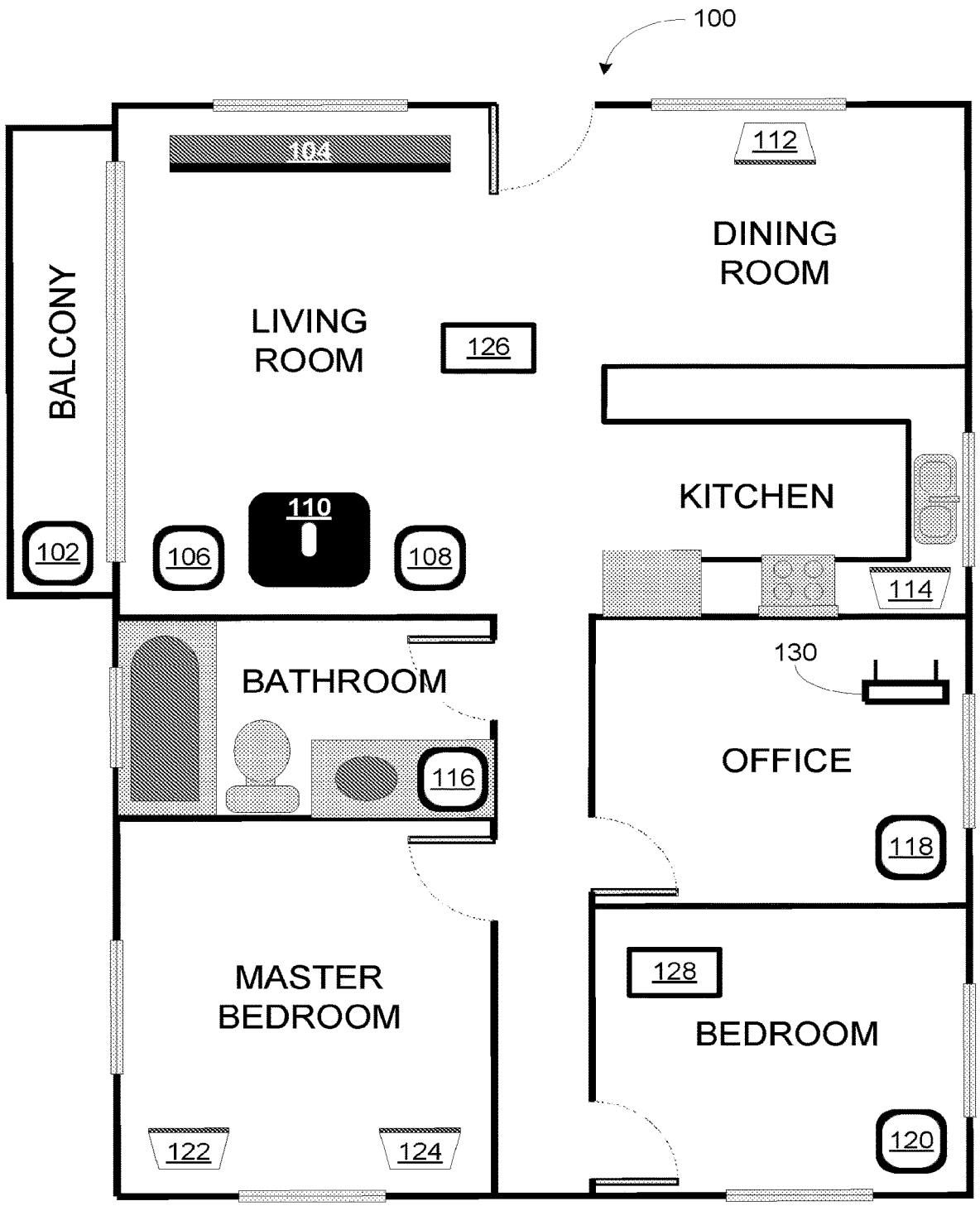
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Examples described herein involve, among other aspects, contextually generating and/or modifying an index of media items. An entire library of media items may be identified by a main media index, and a sub-index (or "second index") may be generated to identify a subset of the media items in the main media index. In one example, the sub-index may identify a subset of the media items that are more frequently played and/or searched for. In one case, when searching for or retrieving media items, a media playback system may refer to such a sub-index before referring to the main media index to identify media items that are available for playback by the media playback system.

In some cases, searching through the sub-index to identify a media item in the subset of media items may be performed more quickly than searching through the main media index. For instance, if a media library is very large, searching through it for a particular media item may require a certain amount of time. By first searching through the sub-index of media items that are frequently played or searched for, a time required to identify the particular media item, if the particular media item is a media item that is frequently played or searched for, may be reduced.

The media playback system may include one or more playback devices communicatively coupled with one another, within a local area network. The one or more playback devices may access the media items for playback by referencing the media index or the sub-index. For example, the media index may identify a file location within the local area network at which a particular media item is stored or a resource identifier to a media item accessible over a wide area network. The one or more playback devices may then use the file location to retrieve the particular media item for playback.

In some cases, a media index for media content available to a media playback system may identify a large number of media items. For example, a media index may identify tens of thousands of media items (e.g., for a personal music library) or millions of media items (e.g., for a commercial media library as may be accessible from a media streaming service). Searching through such a media index for a particular media item might involve considerable time and computational effort. In some implementations, searching through a media index may be performed in linear time, such that searching through another media index that is, for example, twice as large would take on average twice as long to search for a particular media item. In some cases, searching for one or more media items may cause a perceivable delay between performing the search and receiving the results of that search.

In some implementations, the media index may be maintained or stored on a first device (e.g., a playback device of a media playback system) and browsing of the media index may occur on another device (e.g., a controller of the media playback system). In such a media playback system, browsing the media index may involve sending indications of media items in the index from the playback device to the controller, so that the controller can display indications of those media items for browsing.

As indicated above, while a media playback system may index a large number of media items, the media playback system may play a subset of the media items more frequently than the other media items. This subset of media items may also include media items designated as favorite media items, or most recently played media items, among others. In some cases, the subset of media items may change over time. In examples discussed herein, the media playback system, or one or more devices in the media playback system, may generate and maintain a sub-index that identifies such a subset of the media items identified by a main media index.

In some instances, the one or more sub-indices may be associated with a number of different contexts, such as particular users, devices, and zones, among others. The sub-index may identify a fraction of the media items in the main media index, such that searching through the sub-index may be considerably faster than searching through the entire main media index.

In one case, the sub-index may be stored on a memory of a playback device of the media playback system, such that searching may be performed within a local area network of the media playback system. In another case, the main media index may be stored on a computing device accessible over a wide area network, such as the Internet.

The media index may further indicate metadata associated with each media item identified in the media index. In one example, the metadata may contain information regarding a particular media item's total play count and a date and time the particular media item was last played, among other information. In another example, the metadata may contain information about each instance in which the particular media item was played, such as a date, time, whether the media item was manually selected or automatically played (i.e. as playback progresses through a playback queue having the particular media item), a particular user, playback device, or playback zone associated with the instance of playback, and/or whether the media item was played to completion or skipped, to name a few examples. Such information may be referred to herein as "play history." The media playback system may also track requests for playback for a given media item and update the metadata associated with the given media item. Other examples are also possible.

In one example, a playback device in a particular playback zone of the media playback system may determine from among the media items in the media index, a subset of media items that have been recently played and are associated with a given user, controller, or the playback zone. These media items may be indexed into a sub-index that identifies each of the media items in the subset of media items. As one example, the playback device may determine the subset of media items as media items in the media index that has been played a threshold number of times. As another example, the playback device may determine the subset of media items as media items in the media index that has been played within a threshold period of time.

In other examples, the playback device may generate sub-indices based on other contextual information, such as a particular profile, playback device, playback zone, time of day, or date, among other examples. For example, if a particular profile is selected or active on a controller of the media playback system when the playback device is retrieving a media item, the playback device may search within a sub-index associated with that particular profile to retrieve the media item. The subset of media items in the sub-index associated with the particular profile may differ from a subset of media items in another sub-index associated with a different profile. As another example, the subset of media items may also differ between two playback zones. For instance, the playback device may access, store, and/or maintain a first sub-index in association with the particular playback zone, and may access, store, and/or maintain a second sub-index in association with another playback zone or zone group. In some cases, media items in the first sub-index may also be in the second sub-index.

As indicated above, the present application involves a playback device generating and maintaining a sub-index of a media index. In one aspect, a playback device of a media playback system is provided. The playback device includes a network interface, a processor, a data storage, and program logic stored in the data storage and executable by the processor to receive requests to play back media items in a main index, track the received requests to play back the media items in the main index, and based on the tracked requests to play back media items in the main index, determine a set of media items from among the media items in the main index. The set of media items have been played at least a pre-determined threshold number of times within a pre-determined threshold period of time. The program logic is also executable by the processor to index the determined set of media items into a sub-index. The media items in the sub-index are a subset of the media items in the main index.

In another aspect, a method is provided. The method involves receiving requests to play back media items in a main index, tracking the received requests to play back the media items in the main index, and based on the tracked requests to play back media items in the main index, determining a set of media items from among the media items in the main index. The set of media items have been played at least a pre-determined threshold number of times within a pre-determined threshold period of time. The method further involves indexing the determined set of media items into a sub-index. The media items in the sub-index are a subset of the media items in the main index.

In another aspect, a non-transitory computer readable media is provided. The non-transitory computer readable medium has stored thereon instructions executable by a computing device to cause the computing device to perform functions. The functions include receiving requests to play back media items in a main index, tracking the received requests to play back the media items in the main index, and based on the tracked requests to play back media items in the main index, determining a set of media items from among the media items in the main index. The set of media items have been played at least a pre-determined threshold number of times within a pre-determined threshold period of time. The functions further include indexing the determined set of media items into a sub-index. The media items in the sub-index are a subset of the media items in the main index.

In another aspect, a computing device is provided. The computing device includes a processor, and memory having stored thereon instructions executable by the processor to cause the computing device to perform functions. The functions include receiving requests to play back media items in a first index, tracking the received requests to play back the media items in the first index, and based on the tracked requests to play back media items in the first index, determining a set of media items from among the media items in the first index. The set of media items have been played at least a pre-determined threshold number of times within a pre-determined threshold period of time. The functions also include indexing the determined set of media items into a second index. The set of media items in the second index are a subset of the media items in the first index.

In another aspect, a method is provided. The method involves receiving requests to play back media items in a first index, tracking the received requests to play back the media items in the first index, and based on the tracked requests to play back media items in the first index, determining a set of media items from among the media items in the first index. The set of media items have been played at least a pre-determined threshold number of times within a pre-determined threshold period of time. The method further involves indexing the determined set of media items into a second index. The set of media items in the second index are a subset of the media items in the first index.

In another aspect, a non-transitory computer readable media is provided. The non-transitory computer readable medium has stored thereon instructions executable by a computing device to cause the computing device to perform functions. The functions include receiving requests to play back media items in a first index, tracking the received requests to play back the media items in the first index, and based on the tracked requests to play back media items in the first index, determining a set of media items from among the media items in the first index. The set of media items have been played at least a pre-determined threshold number of times within a pre-determined threshold period of time. The functions also include indexing the determined set of media items into a second index. The set of media items in the second index are a subset of the media items in the first index.

In another aspect, a media playback system is provided. The media playback system includes one or more playback devices, and a controller communicatively coupled to at least one of the playback devices. A given playback device from among the one or more playback devices includes a non-transitory computer-readable medium, a processor, and a program logic stored in the non-transitory computer-readable medium and executable by the processor to perform functions. The functions include receiving, from the controller, a request to play back a particular media item in a first index of media items playable by the media playback system, and responsive to receiving the request, determining that the particular media item is not in a second index of media items. The media items in the second index are a subset of the media items in the first index. The functions also include based on determining that the particular media item is not in the second index of media items, determining that the particular media item has been played at least a pre-determined threshold number of times within a pre-determined threshold period of time, and based on determining that the particular media item has been played at least a pre-determined threshold number of times within a pre-determined threshold period of time, modifying the second index to indicate a reference to the particular media item.

In another aspect, a method is provided. The method involves receiving, from a controller, a request to play back a particular media item in a first index of media items playable by a media playback system, and responsive to receiving the request, determining that the particular media item is not in a second index of media items. The media items in the second index are a subset of the media items in the first index. The method further involves based on determining that the particular media item is not in the second index of media items, determining that the particular media item has been played at least a pre-determined threshold number of times within a pre-determined threshold period of time, and based on determining that the particular media item has been played at least a pre-determined threshold number of times within a pre-determined threshold period of time, modifying the second index to indicate a reference to the particular media item.

In another aspect, a non-transitory computer readable media is provided. The non-transitory computer readable medium has stored thereon instructions executable by a computing device to cause the computing device to perform functions. The functions include receiving, from a controller, a request to play back a particular media item in a first index of media items playable by a media playback system, and responsive to receiving the request, determining that the particular media item is not in a second index of media items. The media items in the second index are a subset of the media items in the first index. The functions also include based on determining that the particular media item is not in the second index of media items, determining that the particular media item has been played at least a pre-determined threshold number of times within a pre-determined threshold period of time, and based on determining that the particular media item has been played at least a pre-determined threshold number of times within a pre-determined threshold period of time, modifying the second index to indicate a reference to the particular media item.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
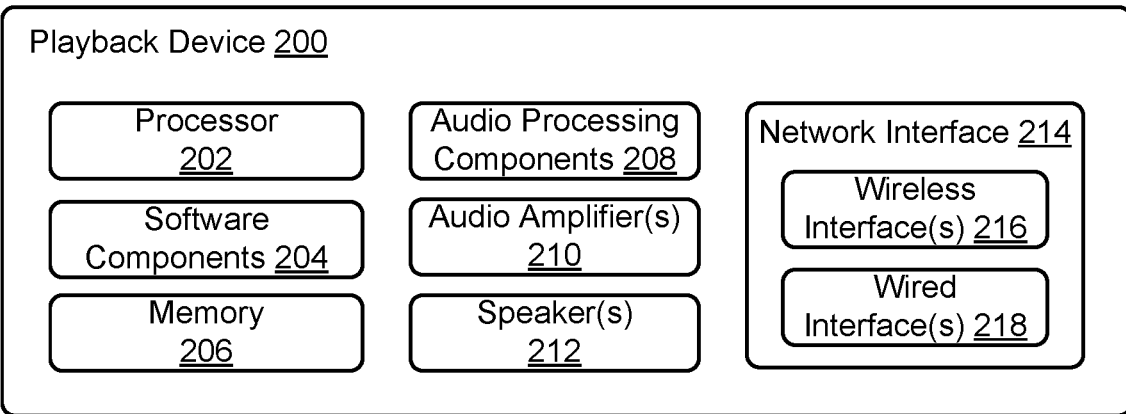
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being played by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
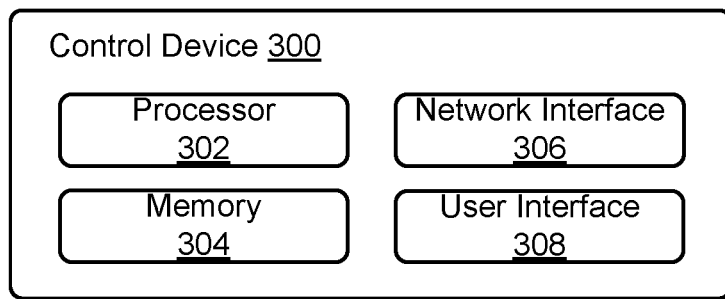
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
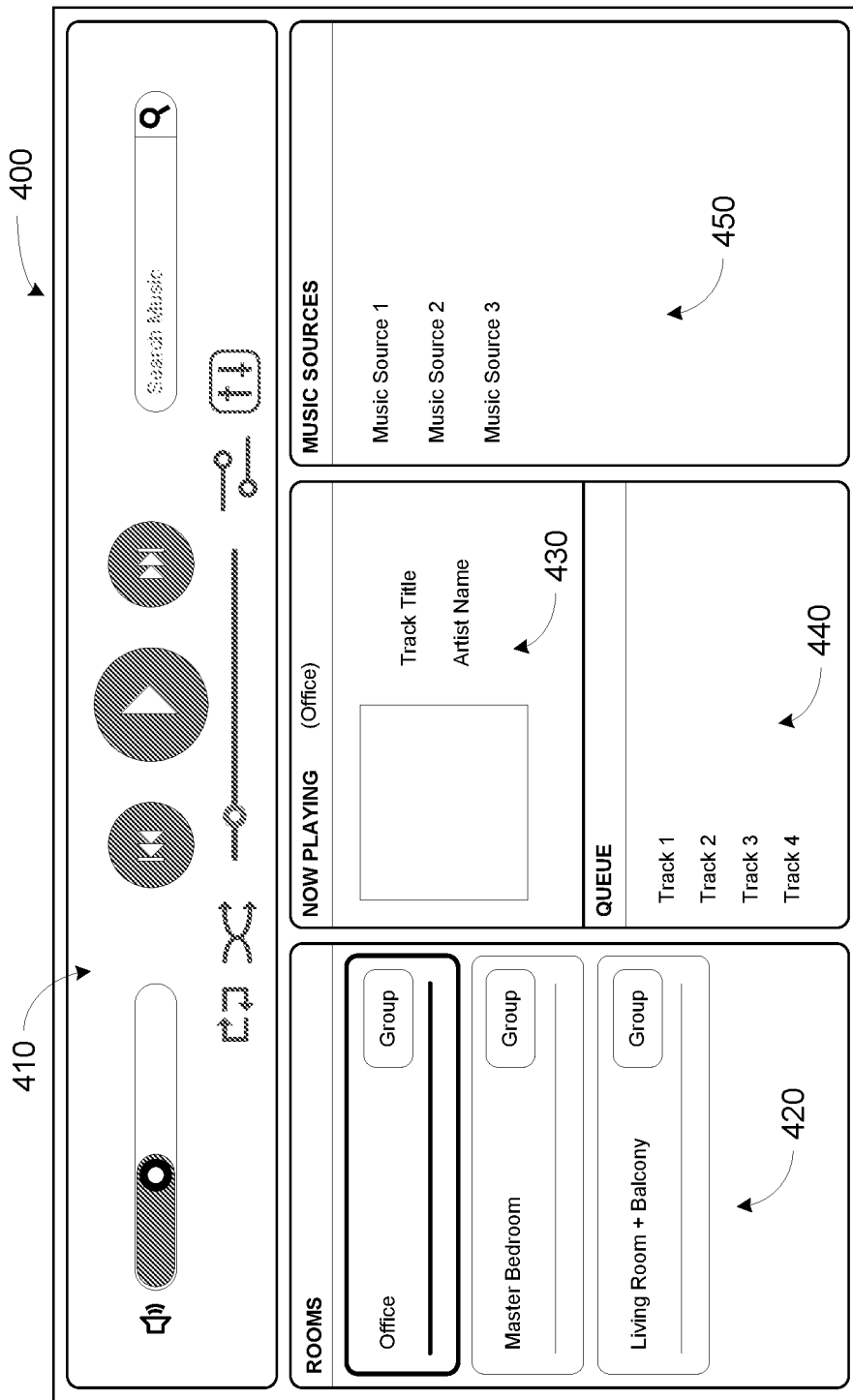
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a network-attached storage (NAS), for example), streaming audio services providing audio content via the Internet (e.g., the cloud), or audio sources connected to the media playback system via a line-in input connection on a playback device or network device, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

In some embodiments, a browse structure may be stored on one or more devices in the media playback system 100. The browse structure indicates a manner in which to display media items of one or more indexes on the user interface 308 of the controller 300, the i.e. the audio content sources region 450 of FIG. 400. In some instances, the browse structure may indicate an order in which to display the media items of one or more indexes. In other instances, the browse structure may specify modifications of the user interface 308 for each media item within one or more indexes, such as font sizes, font styles, font colors, and background colors, among others. Further, the browse structure may indicate a separation of each index into designated sections according to one or more embodiments. The browse structure may be updated or otherwise modified based on a variety of factors, such as the particular device accessing media items in the media playback system, the particular user accessing media items in the media playback system, the particular zone in which the media items of the media playback system are being accessed, the time of day in which the media items of the media playback system are being accessed, the day of the week in which the media items of the media playback system are being accessed, and any combination thereof. Other factors may also be considered when modifying the browse structure.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Method for Generating a Sub-Index

Figure 7:
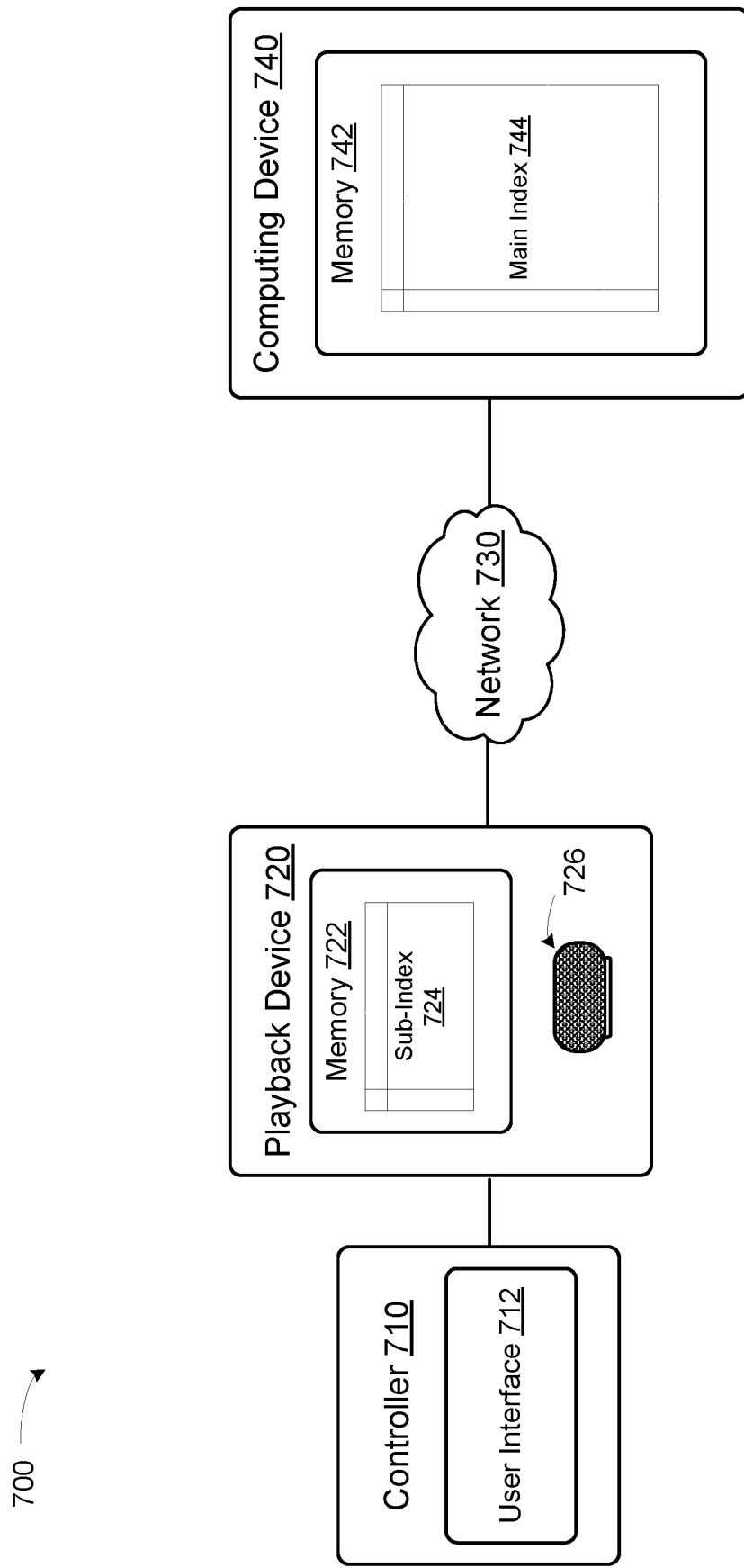
FIG. 7 shows an example operating environment in which the present methods may be practiced.

As discussed above, embodiments described herein may involve a playback device generating a sub-index of a media index. FIG. 7 shows a block diagram illustrating aspects of an example operating environment 700 in which examples discussed herein may be practiced. The operating environment 700 may include a media playback system that includes at least the playback device 710. The controller 710 may be configured to manage and control playback of media content by the media playback system.

In the example operating environment 700, the controller 710 and the playback device 720 may be communicatively connected by way of, for example, respective network interfaces of the controller 710 and the playback device 720. The controller 710 may include a user interface 712, among other components, by which a user may input a search string for one or more media items. The playback device 720 may be similar to the playback device 200 as described above. The playback device 720 may have a memory 722 that stores thereon a sub-index 724 that identifies a subset of the media items that are in the main index 744. In some instances, the playback device 720 includes a speaker 726 configured to play back desired media items. The playback device 720 may also be connected to a computing device 740 over a network 730. The network 730 may be either a local area network or a wide area network, such as the Internet. The computing device 740 may store thereon a main index 744. It should be noted that the example operating environment 700 is merely illustrative, and that other operating environments and configurations in which the example method may be practiced may exist.

In one example method, the playback device 720 may receive requests to playback media items in a main index. The playback device 720 may also track the requests to play back the media items in the main index. The playback device 720 may further determine a set of media items from among the media items in the media index that have been played at least a pre-determined threshold number of times within a pre-determined threshold period of time based on the tracked requests to play back media items in the main index. Additionally, the playback device 720 may index the determined set of media items into a sub-index. The media items in the sub-index may be a subset of the media items in the main index.

Figure 5:
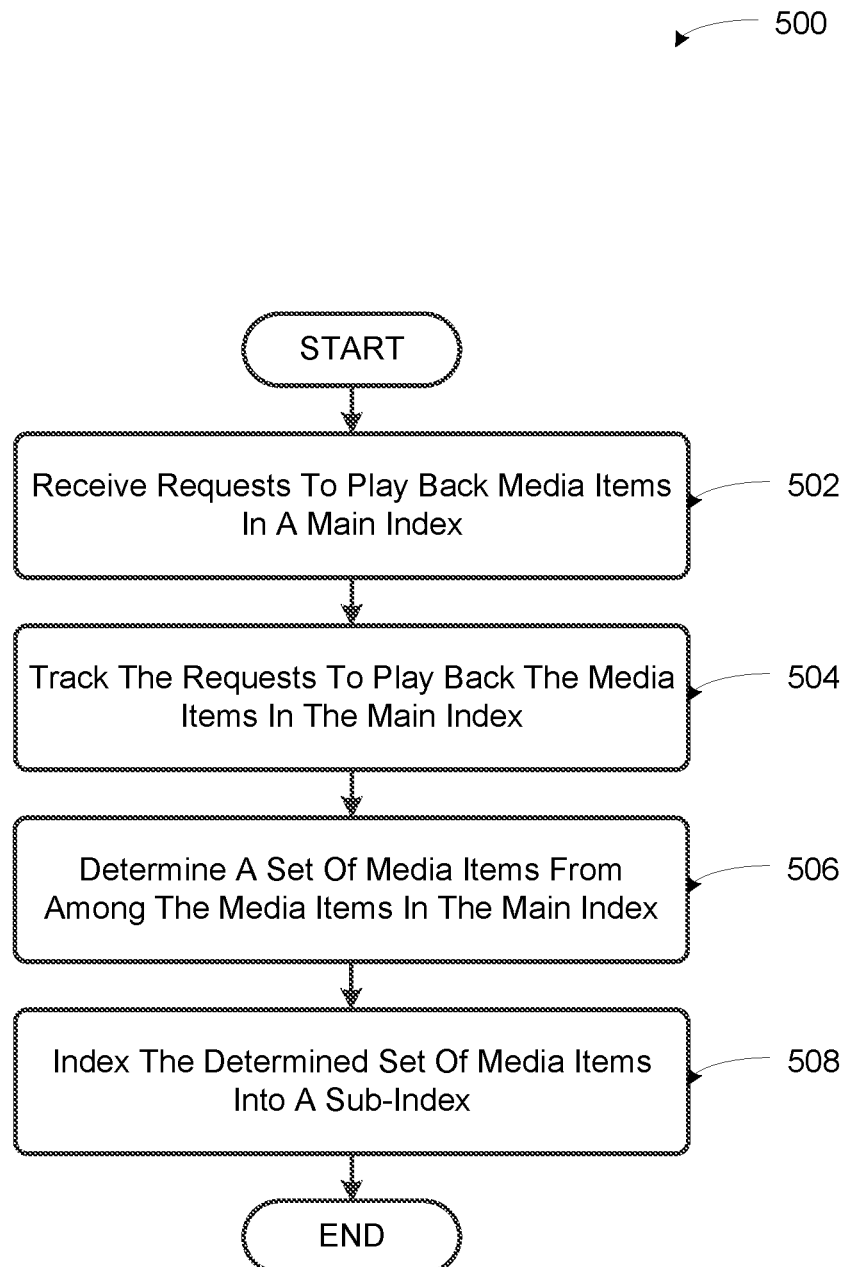
FIG. 5 shows an example flow diagram for generating a sub-index of a media index.

Method 500 shown in FIG. 5 presents an embodiment of a method that can be implemented within an operating environment involving, for example, the media playback system 100 of FIG. 1, one or more of the playback devices 200 of FIG. 2, and one or more of the control device 300 of FIG. 3. The method may also be implemented within the operating environment including the controller 710, the playback device 720, and the computing device 740 as depicted in FIG. 7. Method 500 may include one or more operations, functions, or actions as illustrated by one or more of blocks 502-510. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

a. Receiving Requests to Play Back Media Items in a Main Index.

At block 502, the method involves receiving requests to play back media items in a main index. For instance, a playback device, such as the playback device 720, may receive requests to play back media items in a main index.

A request to play back a media item may result from a user selecting a particular media item for playback via a user interface of a controller. In some examples, the user may navigate through a scrollable list of media items to select the particular media item for playback. In other examples, the user performs a search for one or more desired media items via the user interface of the controller and selects a media item from among the media items displayed as a result of performing the search. Further, a media item may be selected for playback automatically as a part of a playlist, or a playback queue.

The media playback system may store indices of media items, including a main index and a sub-index, in the memory 722 of the playback device 720. In some cases, perhaps in a media playback system that includes multiple playback devices, two or more playback devices may store a copy of the indices. In some embodiments, a playback device may modify an index in response to one or more changes to the available media items, and transmit copies of the modified index to the other playback devices.

As discussed above, indexing of the media items may involve generating or updating an audio content database containing metadata and other associated information. The audio content database may be stored on one or more playback devices or a storage device connected to the media playback system via a local area network or a wide area network, such as the Internet. In some embodiments, the media indices may include metadata, such that a media index identifies media items and metadata associated with the media items. In other embodiments, the metadata is stored separately from the media index.

The controller 710 may send to the playback device 720, requests to play back media items in a media index, such as main index 744. In some cases, the controller 710 may detect input of a search string into the user interface 712 of the controller 710. The search string may be indicative of one or more media items. For example, the search string may indicate at least a portion of a title, an artist, an album, and the like. In other cases, the user interface 712 of the controller 710 may display a browsable list of media items. The controller may detect a selection of a particular media item for playback by the playback device 720. In some embodiments, the controller 710 may include an indication of a particular profile, user, device, or zone with the request for playback of the media item. A controller 710 may receive, from the playback device 720, indications of one or more media items representative of results of a search for one or more media items. The indications of one or more media items may be displayed on the user interface 712 of the controller 710, and the controller 710 may subsequently detect a selection of a particular media item from among the search results for playback by the playback device 720.

b. Tracking the Requests to Play Back the Media Items in the Main Index.

At block 504, the method involves tracking the requests to play back the media items in the main index. The playback device 720 may track the received requests to play back media items and store information associated with each request. A particular request for playback may indicate a variety of pieces of information, including a track name, an artist name, an album name, a genre name, a date and time the request was made, and a context associated with the request, among others. A context may specify a user profile, a particular controller, a device, or a zone associated with a particular request for playback. The requests may be tracked for a pre-determined period of time, such that the tracked requests may indicate a history of playback of media items on the media system.

In some embodiments, tracking the received requests may involve determining one or more metrics from the received requests, and determining if the one or more metrics meet corresponding one or more criteria. For example, tracking the received requests may involve determining whether a particular media item has been played a pre-determined threshold number of times within a pre-determined threshold period of time. As another example, the main media index may contain metadata indicating a date and time that a media item was added to the main media index, and tracking the received requests may involve determining whether a particular media item has been recently added to a main media index. In some cases, a playback device may store an indication as to whether one or more metrics meet a particular criterion. Other example metrics include a length of time since a given media item was last played, a total number of times that the given media item has been played, a number of times that the given media item was played to completion, a number of times that the given media item was skipped, whether the given media item was denoted as favorite, a number of times that the given media item was manually selected for playback, a number of times the given media item was automatically played as a part of shuffle playback, or any combination thereof. This indication may be updated periodically, or in some instances, updated in response to receiving a request for playback of a media item. Such updating may facilitate keeping the indications up to date. The tracked requests may be stored as metadata on the playback device. In some instances, the tracked requests are incorporated in the main media index.

c. Determining a Set of Media Items from Among the Media Items in the Main Index.

At block 506, the method involves determining a set of media items from among the media items in the main index. Continuing with the examples above, the playback device 720 may determine the set of media items from among the media items in the main index that meet a criteria based on the tracked requests to play back media items in the main index. For example, the set of media items may be media items that have been played at least a pre-determined threshold number of times within a pre-determined threshold period of time.

The following description pertains to determining the set of media items that have been played a threshold number of times within a threshold period of time. It should be noted that other criteria may be implemented for determining the set of media items depending on the particular embodiment.

The playback device 720 may access the tracked requests to play back media items and determine whether one or more media items meet particular criteria. For example, the playback device 720 may determine, from the tracked requests, a playback history of a particular media item. The playback device 720 may determine whether the particular media item has been played at least a threshold number of times within a threshold period of time. This determination may be repeated for any number of media items within the main media index. If a media item is determined to have been played at least a threshold number of times within a threshold period of time (which may be referred to herein as "recently played"), the media item may be designated to be within the set of media items.

In some embodiments, the playback device 720 may determine whether one or more media items have been recently played and are associated with a certain context. As a specific example, the playback device 720 may determine a set of media items that have been played at least four times within the last two weeks within an "office" zone. Other contexts, such as other zones, user profiles, devices, controllers, and any combination thereof may be considered as well. Additionally, the determined set of media items may be associated with a time of day, day of week, or day of the year. For example, the set of media items may be media items that have been recently played on Saturdays. Regardless of the particular criteria, a subset of the media items in the main index may be identified.

d. Indexing the Determined Set of Media Items into a Sub-Index.

At block 508, the method involves indexing the determined set of media items into a sub-index. The playback device 720 may index the determined set of media items into a sub-index. The sub-index may include a set of identifiers to file locations to each media item identified by the sub-index, along with information about each media item such as the track name, artist name, album name, and genre name. Other information may be stored in the sub-index as well.

The playback device 720 may determine information about each media item within the determined set of media items from the main index. This information may be indexed into the sub-index. In some embodiments, the sub-index may include additional information, such as the particular context associated with the index, a date and time in which the index was generated or last modified, and a number of media items identified by the sub-index, among other pieces of information. The playback device 720 may modify these additional pieces of information when the sub-index is modified or updated.

In some instances, the playback device 720 may determine an order in which the media items are indexed within the sub-index. In some cases, the determined order may reflect the order in which the media items were added to the sub-index. In other cases, the determined order may be alphabetical by one of the track name or artist name. In further cases, the determined order may specify a priority proportionate to a particular criterion. For example, in the case where the criteria whether a media item has been played within the past week, the first media item identified by the sub-index may be the media item that has been played most recently, with the subsequent media items in the sub-index having been last played prior to the first media item in the sub-index. In other words, the sub-index may be ordered so as to increase the likelihood of finding a particular media item within the sub-index, thereby potentially reducing the average time taken to find a particular media item in the sub-index.

In various embodiments, another set of media items that are similar to the media items in the sub-index may also be included into the sub-index. The similar media items may share a common artist name, album name, or genre with one or more media items in the sub-index, for example. In some cases, the playback device may invoke an external service to determine the similar media items based on the media items in the sub-index. The similar media items may be added into the sub-index. In some embodiments, the similar media items are indexed into a similar media index separately from the main index and the sub-index. Further, the similar media items may also be associated with a particular context, such as contexts that have been previously described.

It should be noted that FIG. 7 is an example depiction of the operating environment in which the methods of the present application are carried out, and are shown for explanatory purposes. Elements of the operating environment may be different without departing from the scope of the claims. For example, multiple playback devices may be present within the operating environment. Further, while the examples above generally refer to functions performed by the playback device 720, one having ordinary skill in the art will appreciate that the functions may also be performed by another playback device, a controller, or any computing device in communication with the media playback system along with, or instead of the playback device 720.

IV. Example Method for Modifying a Second Index

As discussed above, embodiments described herein may involve a playback device modifying a second index of a media index. In some cases, the second index may be a sub-index. Referring again to FIG. 7, the playback device 720 of a media playback system may receive, from a controller, a request to play back a particular media item in a first index of media items playable by the media playback system. The playback device 720 of the media playback system may also determine that the particular media item is not in a second index of media items, wherein the media items in the second index are a subset of the media items in the first index. The playback device 720 may further determine that the particular media item has been played at least a pre-determined threshold number of times within a pre-determined threshold period of time based on determining that the particular media item is not in the second index of media items. Additionally, the playback device 720 may modify the second index to indicate a reference to the particular media item based on determining that the particular media item has been played at least a pre-determined threshold number of times within a pre-determined threshold period of time.

Figure 6:
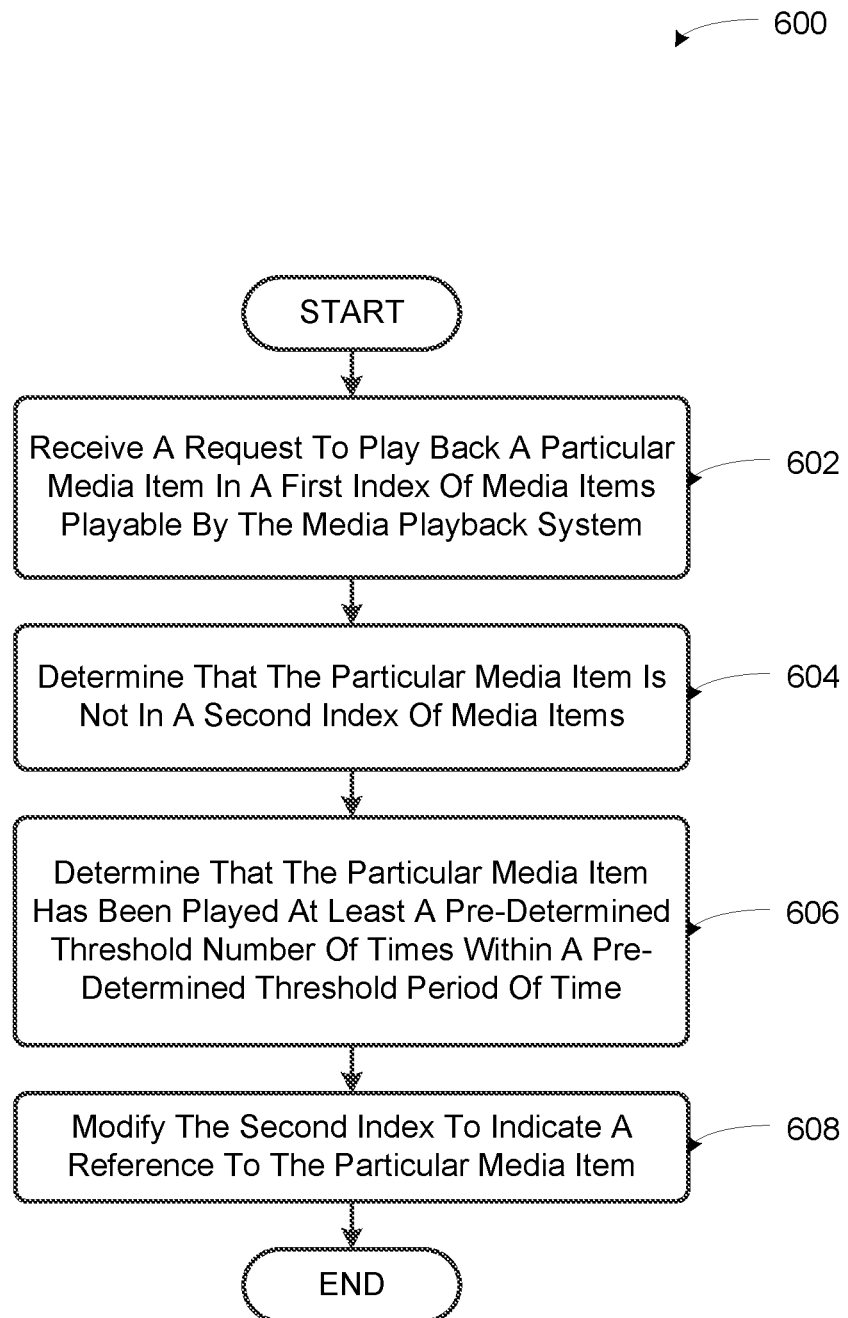
FIG. 6 shows an example flow diagram for modifying a second index of a media index.

Method 600 shown in FIG. 6 presents an embodiment of a method that can be implemented within an operating environment involving, for example, the media playback system 100 of FIG. 1, one or more of the playback devices 200 of FIG. 2, and one or more of the control devices 300 of FIG. 3. The method may also be implemented within the operating environment including the controller 710, the playback device 720, and the computing device 740 as depicted in FIG. 7. Method 600 may include one or more operations, functions, or actions as illustrated by one or more of blocks 602-608. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

a. Receiving a Request to Play Back a Particular Media Item in a First Index of Media Items Playable by the Media Playback System.

At block 602, the method involves receiving a request to play back a particular media item in a first index of media items playable by the media playback system. Referring again to FIG. 7, the playback device 720 may receive the request to play back a particular media item in a first index of media items playable by the media playback system. In some instances, the first index of media items may identify all media items within a particular media library. The media library may be stored on a playback device of the media playback system, or on a computing device connected to media playback system over a local area network or a wide area network, among other examples.

b. Determining that the Particular Media Item is not in a Second Index of Media Items.

At block 604, the method involves determining that the particular media item is in a second index of media items. For instance, the playback device 720 may determine that the particular media item is not in a second index of media items. The second index of media items may identify a subset of the media items in the first index. In other words, the second index may be a sub-index of the first index. The determination may involve searching for the particular media item in the second index, and not finding the particular media item in the second index.

In some cases, as noted above, the second index is associated with a particular context. The method may involve receiving an indication of a particular context and searching through a media index associated with the particular context. In some instances, the second index is associated with a particular context.

c. Determining that the Particular Media Item has been Played at Least a Pre-Determined Threshold Number of Times within a Pre-Determined Threshold Period of Time.

At block 606, the method involves determining that the particular media item has been played at least a pre-determined threshold number of times within a pre-determined threshold period of time. As discussed above, in some cases, data indicative of the playback history of each media item may be stored as metadata. The playback device 720 may determine based on the playback history for the particular media item, a number of instances in which the particular media item was played back within the threshold number period of time.

d. Modifying the Second Index to Indicate a Reference to the Particular Media Item At block 608, the method involves modifying the second index to indicate a reference to the particular media item. Based on the determination that the particular media item has been played at least the threshold number of times within the threshold period of time at block 606, the playback device 720 may modify the second index to include the particular media item. In some cases, modifying the second index may involve appending a reference to the particular media item to the end of the second index.

In other cases, modifying the second index may involve reordering the media items identified by the second index based on one or more rules. In some instances, the media items in the second index may be arranged in descending order according to the number of times the media items have been played, such that the media items that have been played the greatest number of times are placed first in the list. In these instances, the average time required to identify a particular media item in the second index may be reduced. In other instances, the media items in the second index may be arranged in alphabetical order according to the track names of the media items. In either instance, modifying the second index may require the media items in the second index to be reordered according to the ordering rules associated with the second index.

In some embodiments, the playback device 720 may limit the size of the second index, such that the second index identifies up to a certain number of media items. In these embodiments, the playback device 720 may first determine if the size limit for the second index has been reached. If the second index is at the size limit, the playback device 720 may replace one of the media items identified by the second index with the particular media item. The media item in the second index that is replaced may be determined to be the least recently played media item that still meets or exceeds the pre-determined thresholds.

In some examples, the thresholds may be modified when the second index exceeds a size limit. For instance, if the second index exceeds a given size limit, the threshold number of times a media item has been played within a threshold period may be increased. In other examples, the thresholds may be modified if the second index is well below the size limit. As a specific example, if the second index is only ten percent of a given size limit, the threshold number of times a media item has been played within a threshold period of time may be decreased. Other thresholds may be modified in response to the second index exceeding or being well below a size limit.

In some embodiments, the modified second index may be stored on a memory of the playback device 720. The modified second index may be utilized in future search requests from a controller of the media playback system to more quickly identify one or more desired media items from a search request.

In some instances, the modified second index may be transmitted to other playback devices within the media playback system. The other playback devices may store the modified second index on their respective memories. The duplicated second index may be utilized in future search requests from a controller of the media playback system searching for one or more desired media items.

In some cases, the results of a search for one or more media items may be sent back to the controller 710 of the media playback system. The results may identify one or more media items that can be selected for playback by the media playback system. The controller may display these search results on a user interface of the controller.

In various instances, a controller of the media playback system may search for one or more media items, and the search request is sent to a playback device in the media playback system that does not have the most up-to-date second index. In these instances, the playback device may retrieve the most up-to-date second index from another playback device within the media playback system, such as the playback device 720, and subsequently performed the aforementioned methods using the retrieved, up-to-date second index.

While the examples above generally refer to functions performed by the playback device 720, one having ordinary skill in the art will appreciate that the functions may also be performed by another playback device, a controller, or any computing device in communication with the media playback system along with, or instead of the playback device 720.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A system comprising:
   a network device comprising a first network interface;
   at least one cloud server comprising a second network interface;
   at least one processor; and
   at least one non-transitory computer-readable medium comprising program instructions that are executable by the at least one processor such that the system is configured to:
   maintain, in data storage of the network device, at least one first index comprising identifiers of media items that correspond to a playback history of a user profile;
   receive an input representing a command to perform a search for media items corresponding to a search string;
   search, via the network device, the at least one first index for first search results corresponding to the search string;

determine, via the at least one cloud server, that the first search results do not include a match to the search string;

based on the determination that the first search results do not include the match to the search string, search, via the at least one cloud server, at least one second index for second search results corresponding to the search string, wherein the at least one second index comprise identifiers of additional media items relative to the media items indexed in the at least one first index; and cause a controller device to display graphical representations of one or more media items in the second search results.

2. The system of claim 1, wherein the network device comprises the controller device, and wherein the at least one non-transitory computer-readable medium further comprises program instructions that are executable by the at least one processor such that the system is configured to:

receive, via a graphical user interface corresponding to the user profile, a selection of a particular media item from among the second search results; and cause, via the first network interface, one or more playback devices to play back the particular media item.

3. The system of claim 2, wherein the program instructions that are executable by the at least one processor such that the system is configured to receive the input representing the command to perform the search for media items corresponding to the search string comprise program instructions that are executable by the at least one processor such that the system is configured to:

display on the graphical user interface, a search control; and receive, via the graphical user interface corresponding to the user profile, input data representing the search string.

4. The system of claim 1, wherein the at least one non-transitory computer-readable medium further comprises program instructions that are executable by the at least one processor such that the system is configured to:

receive, via the first network interface, data representing a selection of a particular media item from among the second search results; and cause, via the first network interface, one or more playback devices to play back the particular media item.

5. The system of claim 4, wherein the program instructions that are executable by the at least one processor such that the system is configured to cause the one or more playback devices to play back the particular media item comprise program instructions that are executable by the at least one processor such that the system is configured to:

cause a first playback device and a second playback device to play back the particular media item in synchrony.

6. The system of claim 4, wherein the program instructions that are executable by the at least one processor such that the system is configured to cause the controller device to display graphical representations of one or more media items in the second search results comprise program instructions that are executable by the at least one processor such that the system is configured to:

send, via the first network interface, instructions to cause the controller device to display graphical representations of one or more media items in the second search results.

7. The system of claim 4, wherein the program instructions that are executable by the at least one processor such that the system is configured to receive the input represent-ing the command to perform the search for media items corresponding to the search string comprise program instructions that are executable by the at least one processor such that the system is configured to:

receive, via the first network interface, data representing the command to perform the search for media items corresponding to the search string.

8. The system of claim 1, wherein the at least one second index comprises one or more indices of a streaming audio service configured to provide a library of audio tracks that are streamable from one or more content servers, and wherein the program instructions that are executable by the at least one processor such that the system is configured to search at least one second index comprise program instructions that are executable by the at least one processor such that the system is configured to:

search the one or more indices of the streaming audio service.

9. The system of claim 8, wherein the at least one first index comprises one or more indices of a personal library of audio tracks that are playable from one or more computing devices that are connected to a local area network, wherein the network device is connected to the local area network, wherein the at least one cloud server is outside of the local area network, and wherein the program instructions that are executable by the at least one processor such that the system is configured to search at least one first index comprise program instructions that are executable by the at least one processor such that the system is configured to:

search the one or more indices of the personal library.

10. The system of claim 1, wherein the at least one non-transitory computer-readable medium further comprises program instructions that are executable by the at least one processor such that the system is configured to:

cause, via the second network interface, the controller device to display graphical representations of one or more media items in the first search results concurrently with the graphical representations of the one or more media items in the second search results.

11. The system of claim 1, wherein the at least one non-transitory computer-readable medium further comprises program instructions that are executable by the at least one processor such that the system is configured to:

when additional media items are played back by the user profile, update the playback history to indicate additional activity corresponding to the user profile; and modify the at least one first index according to the updated playback history.

12. The system of claim 11, wherein the program instructions that are executable by the at least one processor such that the system is configured to modify the at least one first index according to the updated playback history comprise program instructions that are executable by the at least one processor such that the system is configured to:

re-order the at least one first index such that more-frequently-played media items appear higher in search results when the at least one first index is searched.

13. The system of claim 11, wherein the program instructions that are executable by the at least one processor such that the system is configured to modify the at least one first index according to the updated playback history comprise program instructions that are executable by the at least one processor such that the system is configured to:

modify the at least one first index to include particular media items that are frequently played by the user profile.

14. The system of claim 13, wherein the at least one first index is limited to a particular number of media items, and wherein the program instructions that are executable by the at least one processor such that the system is configured to modify the at least one first index to include the additional media items that are frequently played by the user profile comprise program instructions that are executable by the at least one processor such that the system is configured to:
when the at least one first index reaches the particular number of media items, modify the at least one first index to remove a certain media item that is less frequently played by the user profile.

15. The system of claim 13, wherein the at least one non-transitory computer-readable medium further comprises program instructions that are executable by the at least one processor such that the system is configured to:
send, via the first network interface to the at least one cloud server, data representing the first search results.

16. At least one non-transitory computer-readable medium comprising program instructions that are executable by at least one processor such that a system is configured to:
maintain, in data storage of a network device, at least one first index comprising identifiers of media items that correspond to a playback history of a user profile;
receive an input representing a command to perform a search for media items corresponding to a search string;
search, via the network device, the at least one first index for first search results corresponding to the search string;
determine, via at least one cloud server, that the first search results do not include a match to the search string;
based on the determination that the first search results do not include the match to the search string, search, via the at least one cloud server, at least one second index for second search results corresponding to the search string, wherein the at least one second index comprise identifiers of additional media items relative to the media items indexed in the at least one first index; and
cause a controller device to display graphical representations of one or more media items in the second search results.

17. The at least one non-transitory computer-readable medium of claim 16, wherein the network device comprises the controller device, and wherein the at least one non-transitory computer-readable medium further comprises program instructions that are executable by the at least one processor such that the system is configured to:
receive, via a graphical user interface corresponding to the user profile, a selection of a particular media item from among the second search results; and
cause, via a network interface of the network device, one or more playback devices to play back the particular media item.

18. The at least one non-transitory computer-readable medium of claim 17, wherein the program instructions that are executable by the at least one processor such that the system is configured to receive the input representing the command to perform the search for media items corresponding to the search string comprise program instructions that are executable by the at least one processor such that the system is configured to:
display on the graphical user interface, a search control; and
receive, via the graphical user interface corresponding to the user profile, input data representing the search string.

19. The at least one non-transitory computer-readable medium of claim 16, wherein the at least one non-transitory computer-readable medium further comprises program instructions that are executable by the at least one processor such that the system is configured to:
receive, via a network interface of the network device, data representing a selection of a particular media item from among the second search results; and
cause, via the network interface of the network device, one or more playback devices to play back the particular media item.

20. The at least one non-transitory computer-readable medium of claim 19, wherein the program instructions that are executable by the at least one processor such that the system is configured to cause the one or more playback devices to play back the particular media item comprise program instructions that are executable by the at least one processor such that the system is configured to:
cause a first playback device and a second playback device to play back the particular media item in synchrony.

21. The at least one non-transitory computer-readable medium of claim 19, wherein the program instructions that are executable by the at least one processor such that the system is configured to cause the controller device to display graphical representations of one or more media items in the second search results comprise program instructions that are executable by the at least one processor such that the system is configured to:
send, via the network interface of the network device, instructions to cause the controller device to display graphical representations of one or more media items in the second search results.

22. The at least one non-transitory computer-readable medium of claim 19, wherein the program instructions that are executable by the at least one processor such that the system is configured to receive the input representing the command to perform the search for media items corresponding to the search string comprise program instructions that are executable by the at least one processor such that the system is configured to:
receive, via the network interface of the network device, data representing the command to perform the search for media items corresponding to the search string.

23. The at least one non-transitory computer-readable medium of claim 16, wherein the at least one second index comprises one or more indices of a streaming audio service configured to provide a library of audio tracks that are streamable from one or more content servers, and wherein the program instructions that are executable by the at least one processor such that the system is configured to search at least one second index comprise program instructions that are executable by the at least one processor such that the system is configured to:
search the one or more indices of the streaming audio service.

24. The at least one non-transitory computer-readable medium of claim 23, wherein the at least one first index comprises one or more indices of a personal library of audio tracks that are playable from one or more computing devices that are connected to a local area network, wherein the network device is connected to the local area network, wherein the at least one cloud server is outside of the local area network, and wherein the program instructions that are executable by the at least one processor such that the system is configured to search at least one first index comprise program instructions that are executable by the at least one processor such that the system is configured to:
search the one or more indices of the personal library.

25. The at least one non-transitory computer-readable medium of claim 16, wherein the at least one non-transitory computer-readable medium further comprises program instructions that are executable by the at least one processor such that the system is configured to:
cause, via a network interface of the at least one cloud server, the controller device to display graphical representations of one or more media items in the first search results concurrently with the graphical representations of the one or more media items in the second search results.

26. The at least one non-transitory computer-readable medium of claim 16, wherein the at least one non-transitory computer-readable medium further comprises program instructions that are executable by the at least one processor such that the system is configured to:
when additional media items are played back by the user profile, update the playback history to indicate additional activity corresponding to the user profile; and
modify the at least one first index according to the updated playback history.

27. The at least one non-transitory computer-readable medium of claim 26, wherein the program instructions that are executable by the at least one processor such that the system is configured to modify the at least one first index according to the updated playback history comprise program instructions that are executable by the at least one processor such that the system is configured to:
re-order the at least one first index such that more-frequently-played media items appear higher in search results when the at least one first index is searched.

28. The at least one non-transitory computer-readable medium of claim 26, wherein the program instructions that are executable by the at least one processor such that the system is configured to modify the at least one first index according to the updated playback history comprise program instructions that are executable by the at least one processor such that the system is configured to:
modify the at least one first index to include particular media items that are frequently played by the user profile.

29. The at least one non-transitory computer-readable medium of claim 28, wherein the at least one first index is limited to a particular number of media items, and wherein the program instructions that are executable by the at least one processor such that the system is configured to modify the at least one first index to include the additional media items that are frequently played by the user profile comprise program instructions that are executable by the at least one processor such that the system is configured to:
when the at least one first index reaches the particular number of media items, modify the at least one first index to remove a certain media item that is less frequently played by the user profile.

30. A method to be performed by a system comprising a network device and at least one cloud server, the method comprising:
maintaining, in data storage of the network device, at least one first index comprising identifiers of media items that correspond to a playback history of a user profile;
receiving an input representing a command to perform a search for media items corresponding to a search string;
searching, via the network device, the at least one first index for first search results corresponding to the search string;
determining, via the at least one cloud server, that the first search results do not include a match to the search string;
based on determining that the first search results do not include the match to the search string, searching, via the at least one cloud server, at least one second index for second search results corresponding to the search string, wherein the at least one second index comprise identifiers of additional media items relative to the media items indexed in the at least one first index; and
causing a controller device to display graphical representations of one or more media items in the second search results.

* * * * *